No. 882,986. PATENTED MAR. 24, 1908.
O. ZACHOW & W. BESSERDICH.
AXLE.
APPLICATION FILED AUG. 1, 1907.
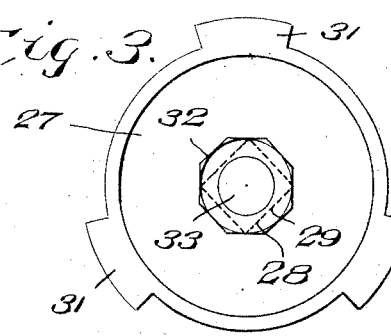
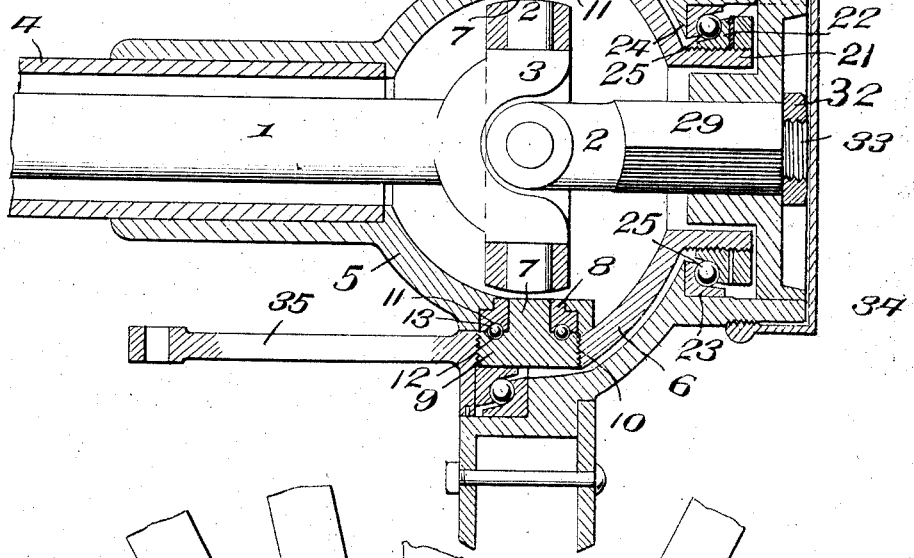
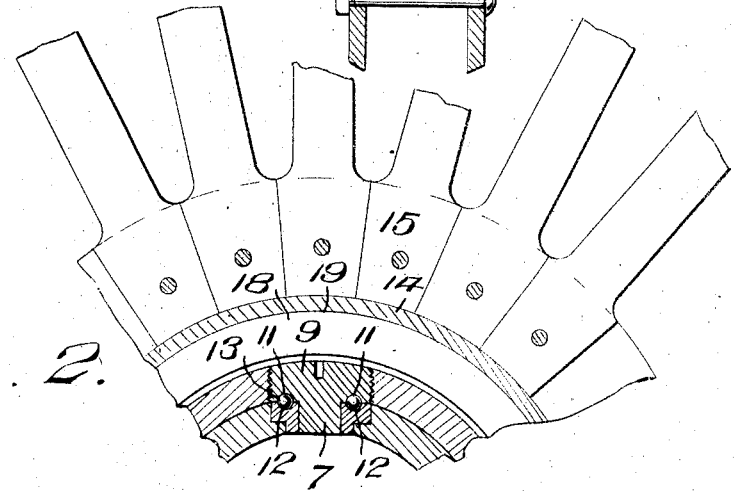
WITNESSES:
INVENTORS
O. Zachow and
W. Besserdich
BY
W. J. Fitzgerald & Co.
Attorneys

UNITED STATES PATENT OFFICE.

OTTO ZACHOW AND WILLIAM BESSERDICH, OF CLINTONVILLE, WISCONSIN.

AXLE.

No. 882,986.

Specification of Letters Patent.

Patented March 24, 1908.

Application filed August 1, 1907. Serial No. 386,612.

*To all whom it may concern:*

Be it known that we, OTTO ZACHOW and WILLIAM BESSERDICH, citizens of the United States, residing at Clintonville, in the county of Waupaca and State of Wisconsin, have invented certain new and useful Improvements in Axles; and we do hereby declare the following to be a full, clear, and exact description of the invention, such as will enable others skilled in the art to which it appertains to make and use the same.

Our invention relates to new and useful improvements in axles and means for attaching wheels thereto and more particularly to that class adapted to be used on automobiles and our object is to provide an axle of this class, whereby the automobile may be guided and, at the same time, power applied to the axle A further object is to provide means for attaching the wheels to the axle and a still further object is to provide a casing for parts of the device, whereby grit and the like will be excluded from the wearing parts thereof.

Other objects and advantages will be hereinafter referred to and more particularly pointed out in the claims.

In the accompanying drawings which are made a part of this application, Figure 1 is a central, sectional view through the wheel and casing, and showing the axle and spindle in full lines. Fig. 2 is a detail, sectional view on an enlarged scale, as seen from line 2—2, Fig. 1, and, Fig. 3 is an elevation of a locking plate employed in fixing the wheel to the spindle.

Referring to the drawings in which similar reference numerals designate corresponding parts throughout the several views, 1 indicates the forward axle, such as is employed in connection with automobiles and 2 indicates the spindle at the end of the axle, said spindle being secured to the axle by means of the usual or any preferred form of universal joint 3, so that the spindle may be swung rearwardly and forwardly when the axle is rotating, thereby guiding the automobile.

The axle 1 is preferably surrounded by a tubular shield 4, to the outer end of which is secured a semi-globular casing 5, employed for protecting the journaled portion of the axle and spindle.

A concavo-convex skein 6 is introduced over the free end of the casing 5 and is pivotally mounted thereon by introducing stub shafts 7 through bearing rings 8, carried by the semi-globular casing 5, the stub shafts 7 being provided with heads 9, which are threaded into openings 10 in the skein 6.

The meeting faces of the bearing rings 8 and heads 9 are provided with races 11 and 12, respectively, in which are located bearing balls 13, so that said skein will readily pivot on the casing 5, when the wheel is shifted to change the course of the vehicle.

The hub 14 of the wheel 15 is adapted to fit loosely over the skein 6 and in order to support the wheel and allow the same to freely rotate around the skein, the inner end of said skein is provided with a flange 16, against which rests a cone 17, while a similar cone 18 is carried in a channel 19 at the inner end of the hub 14, said cones having suitable races therein to receive bearing balls 20, while the outer end of the skein 6 is provided with a band 21, the exterior surface of which is threaded to receive a cone 22, with which co-operates a similar cone 23, carried by the hub 14, said hub having an interiorly disposed peripheral ledge 24, against which the cone 23 rests and these cones are also provided with suitable races to receive bearing balls 25.

The cones 18 and 23 are located between the cones 17 and 22, so that the cone 22, when directed inwardly, on the threaded surface of the band 21, will hold the hub against longitudinal movement and the several cones in engagement with their respective bearing balls and, as the cones become worn, the cone 22 may be moved inwardly to take up such wear, thereby providing a perfect bearing at all times for the hub. After the cone 22 has been properly adjusted on the band 21, suitable locking rings 26 are introduced onto the threaded portion of the band 21, thereby locking the cone 22 in its adjusted position. The wheel 15 is rotated around the skein 6 by means of a locking plate 27, the central portion of which is provided with a square opening 28, to receive the squared end 29 of the spindle 2, thereby causing said locking plate to rotate with the spindle and in order to cause the wheel to rotate with the spindle, the extreme outer end of the hub 14 is provided with notches 30, which are adapted to take in lugs 31, around the periphery of the locking plate 27, so that when the plate is introduced onto the spindle, the periphery of the locking plate will snugly fit within the end of the hub, while the lugs will extend into the notches 30 and, thereby, fix the hub to the spindle, the locking plate being held in position on the spindle by introducing a nut 32 onto the reduced, threaded end 33 of the spindle 2. After the locking plate is secured in position on the end of the spindle, a cap 34 is introduced over the end of the hub 14, thereby excluding the particles of dust and the like from the end of the hub and, at the same time, lending a pleasing effect thereto, said cap being secured in position on the hub in any preferred manner, as by threading a portion of the periphery of the hub and providing coöperating threads on the interior of the cap.

In assembling the parts of the device together, the skein is introduced in position over the end of the casing 5 and the balls 13 placed in position in the races 11, after which the stub shafts 7 are introduced into the bearing rings 8 by directing the heads 9 into the threaded openings in the skein and it will be seen that after the shafts 7 are properly located in the bearing rings, the skein may be readily pivoted on the casing 5, by attaching any suitable form of steering mechanism in engagement with the steering lever 35, carried by the skein 6. After the skein has been secured in position on the casing, the hub 14 is introduced over the skein, the cones 17 and 18 having first been placed in position against the flange 16. The cones 22 and 23 are then secured in position adjacent the outer end of the hub and the cone 22 turned onto the band 21, until the proper bearing adjustment of the hub has been accomplished, when said cone 22 is locked by means of the rings 26. The locking plate 27 is then introduced over the squared end of the spindle 2 and the lugs introduced in the recesses 30 in the hub when the locking plate is secured in position by the nut 32. The cap 34 is then introduced over the end of the hub, thereby, completing the assembling of the several parts.

This form of wheel construction and parts to carry and drive the same are adapted more particularly to be used in connection with automobiles, in which the forward axle, as well as the rear axle is driven and it will be readily seen that by providing the universal joint between the axle and spindle and mounting the wheel thereon in the manner described, said wheel may be positively driven, as well as shifted to guide the automobile. It will also be seen that the wearing or journaled parts of the axle and wheel will be thoroughly protected from grit or the like and also that the skein may be quickly secured in position over the end of the casing and the wheel over the skein.

What we claim is:

A device of the character described, comprising an axle and a spindle coupled together by a universal joint, a semi-globular journal-casing, bearing rings seated in said journal-casing, a correspondingly shaped skein-member, stub axles or trunnions having heads threaded into said skein-members and inserted through said bearing rings, said heads being provided with races containing ball-bearings adapted for pivoting said skein-member upon said journal-casing, and a semi-globular hub-member having a sleeve-extension at its outer end, a locking ring threaded upon said sleeve extension means for the retention in place of said hub-member at its sleeve extension end against endwise displacement, said skein-member having an annular flange at its inner end, and a hub-member having a corresponding recess opposed to said flange, cone-sections being arranged in said annular recess and retained by said flange, ball-bearings interposed between said cone-sections, said hub-member having its sleeve-extension provided interiorly with an annular ledge or shoulder and said skein-member having a like sleeve extension, additional cone-sections arranged within said hub-sleeve extension and between said ledge and said skein-sleeve extension, with ball-bearings interposed between said additional cone-sections, said locking ring and annular ledge or shoulder being adapted to effect the retention of said additional cone-sections in place.

In testimony whereof we have signed our names to this specification in the presence of two subscribing witnesses.

OTTO ZACHOW.
WILLIAM BESSERDICH.

Witnesses:
W. A. OLEN,
O. L. OLEN.